Patented Dec. 14, 1948

2,456,393

UNITED STATES PATENT OFFICE 2,456,393

DRYING OF SODIUM NITRITE TO OBTAIN A RELATIVELY NONCAKING GRANULAR FORM

Douglas R. Duncan, Gibbstown, N. J., assignor to E. I. du Pont de Nemours & Company, Wilmington, Del., a corporation of Delaware No Drawing. Application July 20, 1945, Serial No. 606,289

6 Claims. (Cl. 23—104)

This invention relates to a method of preparing chemical material in the form of free-flowing discrete particles and more particularly to such a method applied to inorganic salts having a tendency normally to set and form caked masses on prolonged storage.

In the case of a large number of materials, prolonged storage in relatively finely-divided condition frequently results in setting or formation of a caked mass that possesses no free-running properties and can be broken up only with considerable difficulty. Whatever the cause of such setting, it takes place particularly with a great many water-soluble materials such as ammonium nitrate, sodium nitrate, sodium chloride, sodium nitrite, and the like. Various conditions have been considered to contribute to the undesirable agglomeration and hardening of such salts, including the effect of moisture content and atmospheric moisture, the presence of more soluble impurities, passage through transition points, etc.

Sodium nitrite is a material which exhibits the foregoing tendency to set to a hard mass. Attempts have been made to overcome this by the inclusion of inhibitors, but the disadvantage then results that an impurity is introduced into the salt, which is undesirable for many of its uses.

An object of the present invention is a novel process for the production of chemical compounds in dry, free-flowing form such that the setting tendency is substantially reduced or overcome without the introduction of any chemical inhibitor. A further object is such a process that is particularly effective when applied to sodium nitrite. Additional objects will be disclosed as the invention is described more at length hereinafter.

I have found that the foregoing objects are accomplished, and a product obtained that possesses superior properties, when I subject a mass of a chemical compound in solid but wet condition to an elevated drying temperature and bring this material to substantially complete dryness without agitation of said material. It then has a hard surface crust and frequently has caked throughout, though still friable. The caked material is then disintegrated by suitable crushing procedure into a product comprising discrete particles that flow readily and retain this characteristic on storage.

I find sodium nitrite especially to be greatly improved by such treatment. Desirably I dry the salt at a temperature above 158° C. and disintegrate at a temperature above or below that point. Sodium nitrite has a transition point at substantially 158° C., where crystal changes occur, and it is believed that passage of the salt through this transition point is beneficial to the process of the invention. An effective drying temperature for sodium nitrite is around 200° C. The invention as applied to sodium nitrite, however, is in no way limited to the use of such elevated temperatures.

The following illustrative examples will show specific embodiments of procedures for carrying out the invention.

Example 1

About 2 pounds of sodium nitrite, having a water content of 2.9%, was dried for one hour at a temperature of 130° to 199° C. The salt was on trays in layers about ½ inch deep and was unagitated during drying. At the end of the drying period, the moisture content was 0.04%. When cooled, the material was crushed and passed through a 10-mesh screen, having a fineness modulus of 1.77, the significance of which will be discussed later. The disintegrated material was free-flowing and poured like sand. It remained free-flowing after prolonged storage. Sodium nitrite prepared by the usual processes and stored for a similar time was set hard and was almost impenetrable.

Example 2

Another lot of sodium nitrite was dried in the same manner for a period of 45 minutes at a maximum temperature of 195° C., at which time it had a moisture content of 0.03%. The disintegrated salt had a fineness modulus of 1.46 and was in good, free-running condition, remaining in this form after an extended storage period.

Example 3

Three hundred pounds of sodium nitrite was dried on trays, in layers of ½ inch depth, at a temperature of 50—90° C. for a period of around 48 hours. The dried material was crushed to pass a 10-mesh screen, and then had no determinable moisture content. Two lots of the material were stored for ten days, (1) cold and (2) hot. At the end of the storage period, both lots were soft and free-flowing. Regular, untreated sodium nitrite, stored under the same conditions, had set hard, particularly the material in hot storage.

The method of the invention comprises, as has been shown, heating without agitation material wet with a limited amount of water until said material is substantially completely dry. The material, thus dried statically, will have a hard surface crust and ordinarily will be in the form of a crumbly mass. In carrying out the final drying process, it is desirable that the material used shall have a water content within certain limits. In the manufacture of sodium nitrite, for example, nitrogen oxides are absorbed in an alkaline solution, and the nitrite is crystallized out. After centrifuging, the crystals are given a preliminary drying in a drier operating under non-static conditions, for example in a rotary drier. For the final drying step in accordance with the invention, wet sodium nitrite having a water content of between 1% and 4% is taken after the preliminary drying and subjected to static drying at an elevated temperature until substantially no water is left, for example to less than 0.1%. Desirably the material for the final drying will have a water content of about 2%.

Various drying methods may be employed, as on trays in ovens or dry houses of known elevated temperatures. I find a suitable procedure for plant operation to comprise continuous drying wherein the nitrite or other material is in suitable containers on a horizontal belt conveyor, whereby it is exposed to the drying temperature for a predetermined time. With such a method there is no agitation or tumbling of the material, and the drier can be made in standard sections, if desired. The temperature of drying must be sufficiently elevated to ensure substantially complete removal of the water, and the depth of the material in the containers may be adjusted to suit the conditions. In large scale operations, temperatures above 100° C. are desirable to hasten drying. In the case of sodium nitrite, I find it desirable to have the maximum temperature above 158°, as this is a transition point for this salt. When sodium nitrite is heated through this transition temperature, the alteration in the crystal surfaces has been found to be beneficial to the final product. The preferred drying temperature is around 200° C.

The foregoing static drying method results in a hard crusted mass of material as a result of a precaking procedure. This agglomerate is broken up by any desired crushing arrangement or device. I find it desirable to pass the disintegrated material through a 10-mesh screen. The fineness of the screened particles has been found to be dependent to a considerable degree on the moisture content of the wet salt before the final drying step. The product of the invention comprises generally relatively large crystals, very little of which passes a 100-mesh screen. A convenient way of designating the size of particles is by expressing this as a Tyler fineness modulus, which gives a weighted average and is determined by adding the percentage amounts held successively on 14-, 28-, 48-, and 100-mesh screens and dividing the cumulated total by 100. The higher the modulus, therefore, the coarser the material, said modulus being generally between 1.10 and 2.10. A representative sodium nitrite produced by the invention, starting with a 2% moisture content in the wet material, screened as follows:

| | |
|---|---|
| Held on 14-mesh | 0 |
| Held on 28-mesh | 10 |
| Held on 48-mesh | 53 |
| Held on 100-mesh | 93 |
| | 156 |
| Fineness modulus | 1.56 |

While the examples have applied the invention to the preparation of free-flowing sodium nitrite, other chemical materials may be prepared in the same manner so that they will remain in discrete, pourable particles after extended storage. Such organic compounds as urea and hexamethylenetetramine may advantageously be treated by this procedure, water-insoluble salts like calcium sulfate, and water-soluble inorganic salts such as ammonium nitrate, sodium nitrate, ammonium sulfate, sodium perborate, sodium chloride, and the like.

The advantages of my invention are apparent. It is essential for the efficient use of sodium nitrite, for example, in many cases, that it remain in pourable condition and in the form of discrete particles. The prior art methods have attempted to accomplish this by the use of inhibitors but almost invariably have had to introduce an impurity into the salt to be protected. The present method gives the desired advantages without use of an inhibitor, but merely by a treatment that entails no chemical change in the composition.

It will be understood that many variations may be effected in compositions and details of treatment, without departure from the spirit of the invention, which is limited only by the following claims:

I claim:

1. The process of producing sodium nitrite in dry, free-flowing form, which comprises subjecting a mass of solid wet sodium nitrite to a temperature above 158° C., drying said sodium nitrite substantially completely at this elevated temperature without agitation, and disintegrating the resulting adherent agglomerate into discrete particles.

2. The process of producing sodium nitrite in dry, granular form, which comprises subjecting sodium nitrite of a water content of between 1 and 4% to a temperature above 158° C., drying said sodium nitrite substantially completely at this elevated temperature without agitation, and disintegrating the resulting adherent conglomerate into discrete particles.

3. The process of claim 2, in which the wet sodium nitrite is heated to a temperature around 200° C.

4. The process of claim 2, in which sodium nitrite of a water content around 2% is subjected to the elevated drying temperature.

5. The process of claim 2, in which wet sodium nitrite supported on a carrier is passed continuously through the high temperature drying zone.

6. The process of claim 2, in which the wet sodium nitrite is dried to a water content lower than 0.1% $H_2O$.

DOUGLAS R. DUNCAN.

REFERENCES CITED

The following references are of record in the file of this patent:

UNITED STATES PATENTS

| Number | Name | Date |
|---|---|---|
| 2,032,699 | Hayes et al. | Mar. 3, 1936 |
| 2,316,154 | Chambers | Apr. 13, 1943 |

OTHER REFERENCES

Thorpe: Dictionary of Applied Chemistry, vol. V, page 16, ed. of 1916, pub. by Longmans, Green, and Co., London.

Recueil des Travaux Chimiques des Pays-Bas, vol. 62, p. 705, (1943).

Riegel: Chemical Machinery, pages 373-375, pub. by Reinhold Pub. Corp., New York (1944).